US009435555B2

(12) United States Patent
Zimmer

(10) Patent No.: US 9,435,555 B2
(45) Date of Patent: Sep. 6, 2016

(54) MISTING FAN SYSTEM AND METHOD

(71) Applicant: John C. Zimmer, Lafayette, LA (US)

(72) Inventor: John C. Zimmer, Lafayette, LA (US)

(73) Assignee: Tech Oil Products, Inc., New Iberia, LA (US)

(*) Notice: Subject to any disclaimer, the term of this patent is extended or adjusted under 35 U.S.C. 154(b) by 616 days.

(21) Appl. No.: 13/645,085

(22) Filed: Oct. 4, 2012

(65) Prior Publication Data

US 2013/0181062 A1  Jul. 18, 2013

Related U.S. Application Data

(60) Provisional application No. 61/543,898, filed on Oct. 6, 2011.

(51) Int. Cl.
*F24F 6/14* (2006.01)
*F24F 5/00* (2006.01)
*F24F 7/007* (2006.01)

(52) U.S. Cl.
CPC ............... *F24F 6/14* (2013.01); *F24F 5/0035* (2013.01); *F24F 7/007* (2013.01)

(58) Field of Classification Search
CPC ........ Y02B 30/545; F28C 3/08; F25B 19/04; F25B 19/02; F24F 6/14; F24F 7/007; F24F 5/0035
USPC ............. 261/28, 79.1, 79.2, 90, 828; 239/8; 417/375–409
See application file for complete search history.

(56) References Cited

U.S. PATENT DOCUMENTS

| 2,079,117 | A | * | 5/1937 | Hays ......................... F24F 6/06 261/30 |
| 2,628,594 | A | * | 2/1953 | Teague, Jr. .................. 91/363 R |
| 2,635,920 | A | * | 4/1953 | Boyce ................. A01M 7/0014 239/176 |
| 2,695,598 | A | * | 11/1954 | Strang ............................ 91/177 |

(Continued)

OTHER PUBLICATIONS

Gardner Denver "Directional control valves" available online at <https://web.archive.org/web/20090428131816/http://www.gardnerdenverproducts.com/Microsite_Product.aspx?id=4124&n=482> on 28 Apr. 2009.*

(Continued)

*Primary Examiner* — Amber R Orlando
*Assistant Examiner* — Stephen Hobson
(74) *Attorney, Agent, or Firm* — Jones Walker LLP

(57) ABSTRACT

A fan system for use on oil and gas rigs. The system includes a hydraulic motor for generating a rotational force from a hydraulic fluid, a water pump member for pumping water, a control member for controlling the flow of hydraulic fluid and water. The system also includes a fan device having a plurality of individual blades for providing an airflow, with the fan device being operatively connected to the hydraulic pump member and a nozzle connected to the water pump member for spraying a mist, with the nozzle containing a variable opening for varying the pressure and volume of water discharged. A leak path is provided for capturing and channeling leaking fluids so that fluids are contained within the fan device not in the air stream.

7 Claims, 7 Drawing Sheets

(56) References Cited

U.S. PATENT DOCUMENTS

| | | | | | |
|---|---|---|---|---|---|
| 2,709,578 | A | * | 5/1955 | Holderness | F24F 6/06 261/30 |
| 2,838,003 | A | * | 6/1958 | Joy | 91/498 |
| 3,804,383 | A | * | 4/1974 | van Diepenbroek | F24F 6/06 261/30 |
| 4,657,712 | A | * | 4/1987 | Milbocker | B01F 3/04035 239/225.1 |
| 5,598,935 | A | * | 2/1997 | Harrison et al. | 212/197 |
| 5,871,412 | A | * | 2/1999 | Moser | F16H 9/04 474/76 |
| 6,086,053 | A | * | 7/2000 | Natschke | A01K 1/0082 239/222.11 |
| 6,257,501 | B1 | * | 7/2001 | Roach | B05B 1/207 239/214 |
| 6,257,502 | B1 | * | 7/2001 | Hanish | B05B 1/14 239/290 |
| 6,272,874 | B1 | * | 8/2001 | Keeney | B63J 2/04 261/117 |
| 6,786,701 | B1 | * | 9/2004 | Huang | F04D 29/705 239/77 |
| 6,789,787 | B2 | * | 9/2004 | Stutts | F24F 5/0035 261/28 |
| 7,082,775 | B1 | * | 8/2006 | Edwards et al. | 62/121 |
| 7,448,600 | B1 | * | 11/2008 | Boulter | C02F 1/048 159/4.4 |
| 7,566,048 | B1 | * | 7/2009 | Ptak | F24F 6/14 222/383.1 |
| 7,967,900 | B2 | * | 6/2011 | Uchida | A63L 9/14 95/211 |
| 8,123,290 | B1 | * | 2/2012 | Aiken et al. | 297/180.1 |
| D681,795 | S | * | 5/2013 | Huang | D23/328 |
| 8,496,232 | B1 | * | 7/2013 | Nelson | F24F 5/0035 261/28 |
| 2007/0131883 | A1 | * | 6/2007 | Goodrich et al. | 251/12 |
| 2007/0152356 | A1 | * | 7/2007 | Huang | F24F 6/00 261/81 |
| 2008/0056887 | A1 | * | 3/2008 | Iannizzaro | F04C 2/086 415/121.2 |
| 2008/0115488 | A1 | * | 5/2008 | Iida | B60K 17/105 60/484 |
| 2008/0169575 | A1 | * | 7/2008 | Chen | F24F 5/0035 261/28 |
| 2008/0237900 | A1 | * | 10/2008 | Junkel | F24F 5/0035 261/28 |
| 2009/0014556 | A1 | * | 1/2009 | Gokal | F24F 5/0035 239/289 |
| 2010/0224072 | A1 | * | 9/2010 | Ulanov | A61L 9/12 96/222 |
| 2011/0101128 | A1 | * | 5/2011 | Huang | F24F 6/12 239/289 |
| 2011/0168105 | A1 | * | 7/2011 | Bain | A01K 1/0047 119/489 |
| 2012/0304636 | A1 | * | 12/2012 | Nelson | F16H 61/438 60/459 |
| 2013/0181062 | A1 | * | 7/2013 | Zimmer | F24F 6/14 239/8 |
| 2013/0206009 | A1 | * | 8/2013 | Huang | F24F 3/166 96/224 |
| 2013/0219933 | A1 | * | 8/2013 | Hubert | F04D 19/002 62/121 |

OTHER PUBLICATIONS

Gardner Denver "Directional control valves" available online at <https://web.archive.org/web/20090428131816/http://www.gardnerdenverproducts.com/Microsite_Product.aspx?id=4124&n=482> on Apr. 28, 2009.*

* cited by examiner

FIG. 6
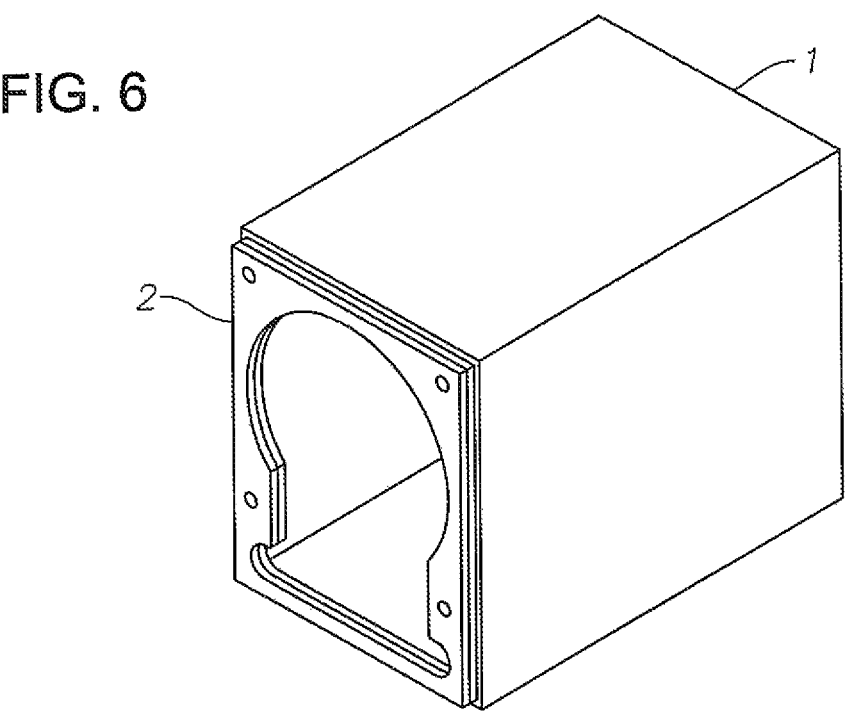
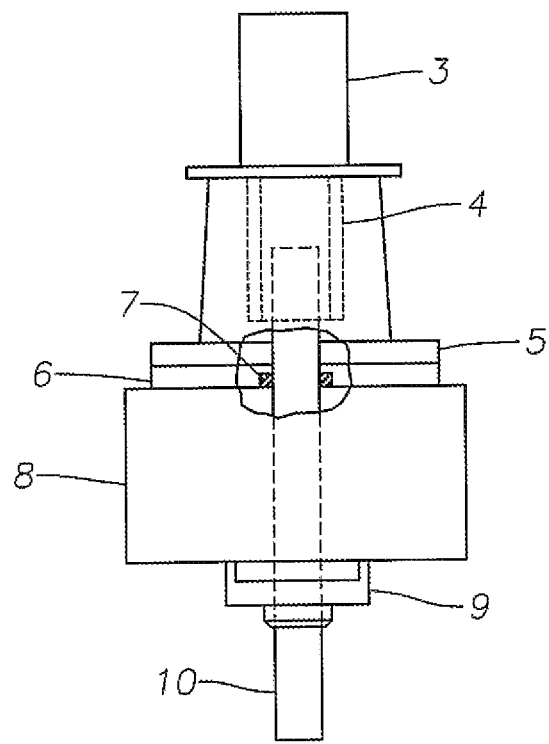
FIG. 7

MISTING FAN SYSTEM AND METHOD

This application claims priority from provisional application Ser. No. 61/543,898, filed 6 Oct. 2011, entitled "Hydraulic Fan System and Method" which is incorporated herein by express reference. This disclosure relates to a fan system and method. More particularly, but without limiting the scope, this disclosure relates to a misting fan system and method.

BACKGROUND OF THE INVENTION

In the oil and gas industry, operators drill and produce hydrocarbons in all areas of the world. Many times, the operations are in offshore waters and/or remote regions. In some of these environments, the areas are in warm to hot climates. The need to keep employees cool during the hot months is not only for comfort but also safety, as heat exhaustion and stroke are real possibilities. In today's industry, operators may have a dedicated employee whose only job is to walk the location and give cold water to employees. Another tool used by operators to keep workers cool is the use of fans. Fans have been around for many years and they are driven by all types of power—mechanical, electrical, pneumatic, hydraulic, etc. The act of turning a fan blade directly or by belt is known in the art.

Hydraulic fans have been tried in the past for personnel cooling but the inevitable hydraulic leaks cause the fans to blow oil on the deck and onto personnel. As understood by those of ordinary skill in the art, drilling and production rigs have many safety regulations due to the hazardous working environment. Therefore, rigs and operating companies not wanting the liability, resorted to mostly electric fans. Evaporative fans are by far the most common and commercially available from several manufactures under the trade names such as Port-A-Cool and Cool Space. This is the preferred method used on drilling rigs. Low pressure misting fans are not used because the larger drops of the air create slicks. Mist fans are available but are not used because of this limitation. They are only available in 120V operation which limits the horse power and therefore the volume of air. The water available on land drilling rigs is very bad in quality as it comes straight out of the ground without any treatment. This water would stop up the mist nozzle which range from 0.008" to 0.020". More volume is needed because their area are located outside where wind can adversely affect the effectiveness of a misting of evaporative fan.

In general, portable fans consist of a motor and a blade. With the prior art portable evaporative fans (PEF) and misting fans, a means for introducing moisture (humidity) in the air stream is utilized. The moisture introduced in PEF's generally includes a cardboard with perforated holes placed in the suction side of the fan blades. Water is pumped on the top of the cardboard and the water flows down the length. Moisture is picked up as the air passes through the holes in the wet cardboard. Most common sizes come in 36" and 48" blades. The prior art fans tend to be large in size and weigh a significant amount. A misting fan sprays water and uses electrical motor to turn the fan blades. This is only available in 120V without filtration.

Also, prior art fans run off 120V system. A standard outlet is 15 amps or max of 20 amps, and hence two ⅓ HP motors are the maximum horsepower available, therefore, limiting the possible cubic feet per minute (CFM) airflow there through, since the horsepower and airflow (CFM) are directly related.

Additionally, with the PEF's, all of the air flow containing moisture flows over the electric motors, belt and pump causing motor failure at a high rate. As those of ordinary skill in the art will appreciate, the electric system has to be explosion proof when used on hazardous locations, which in turn adds to the cost, size and weight of the fans, and are limited to a single speed. As understood by those of ordinary skill in the art, safety is compromised because the electric cord is laying on a wet metal deck and is often cut by the moving of heavy equipment, as on a drilling and production rigs. The cardboard becomes less effective by the collection of dirt as is often common on locations with caliche or limestone, or in dry, desert like conditions. The water tank area also collects the dirt and blocks the pump suction. A typical misting fan would have an electric motor but would not be able to control the speed or amount of mist.

SUMMARY OF THE INVENTION

An apparatus for use with workers on an oil and gas rig is disclosed. The apparatus may include two components: (1) skid with hydraulic power supply and (2) one or more fans.

In another embodiment, the apparatus comprises a hydraulic fan motor for generating a rotational force from a hydraulic fluid, a water pump member for pumping high pressure water. and a control member for controlling the pressure of the hydraulic fluid and for unlimited speed control to one or more fan devices. The apparatus further comprises a fan device having a plurality of individual blades for providing an airflow, with the fan device being operatively connected to the hydraulic pump and a misting system operatively connected to the water pump member for spraying a mist or fog on the workers at a greater distance.

In one embodiment, the hydraulic fan motor is contained within a container configured to capture escaped hydraulic fluid from the hydraulic fan motor. The fan device generally includes a shaft attached to the hydraulic fan motor and enclosed within a cylinder, a plurality of blades attached to the shaft, and a leak passage formed to provide a path for the hydraulic fluids to drain from the hydraulic fan motor in case of a hydraulic seal failure. In one embodiment, the misting system includes a first array of nozzles disposed downstream of the fan device. The misting system may further include a second array of nozzles disposed to deliver mist for extra cooling or emergency cooling or fire suppression. The fan device may generate 0-50,000 cubic feet per minute of air flow volume delivered to the worker and the misting system may generate approximately 1,000 pounds per square inch of mist pressure.

Additionally, the control member may comprise a speed regulator means for controlling the variable speed of the hydraulic fan motor. The control member may also include a water valve for controlling the water flow from the water pump member. The control member may have a first remote control means for opening and closing the speed regulator means from a remote area on the rig and the water valve may include a second remote control means for opening and closing the water flow.

A method of spraying a worker with a water mist on an oil and gas rig is also disclosed. The rig may be in offshore waters or on land. The method comprises providing a hydraulic fan system that includes a hydraulic fan motor for generating a rotational force from a hydraulic fluid, a water pump member for pumping water, a control member for controlling the flow and pressure of hydraulic fluid. A fan device having a plurality of blades for providing an airflow, with the fan device being operatively connected to the hydraulic fan motor, and a misting system operatively connected to the water pump member for spraying a mist on the workers. The method further includes spraying the worker with the water mist on the rig. The misting system may include a first array of nozzles positioned downstream of the air flow through the fan device. In one embodiment, a second array of nozzles is also provided. The control member may have hydraulic fluid valves operatively attached to the hydraulic pump and a water valve operatively attached to the water pump for selectively supplying water. The fan device may include a shaft enclosed within a cylinder and a leak path formed to provide for passage of hydraulic fluids. It should be noted that this method of spraying a worker may include for treating a worker who has heat stroke or for a burn victim. The additional water control valve may disperse twice the volume of mist on to victim when in an emergency.

In yet another embodiment, a misting fan system for use on oil and gas rigs is disclosed. The system includes a hydraulic fan motor for generating a rotational force from a hydraulic fluid, a water pump member for pumping water, and a control means for controlling the flow and pressure of hydraulic fluid and water. The system may further comprise a fan device having a plurality of individual blades for providing an airflow, with the fan device being operatively connected to the hydraulic fan motor and a nozzle connected to the water pump member for spraying a mist, with the nozzle containing a variable opening for varying the pressure and volume of water discharged. In one embodiment, an electric motor turns the main hydraulic pump, and the flow is then divided to one or more fans. The water is pumped through using the same method, with the high pressure pump feeding many fan devices.

BRIEF DESCRIPTION OF THE DRAWINGS

FIG. 6 is a perspective view of the cover and gasket embodiment depicted in FIG. 1.

FIG. 7 is a partial sectional view of some components of the complete fan drive assembly depicted in FIG. 2.

DETAILED DESCRIPTION OF THE PREFERRED EMBODIMENTS

Figure 1A:
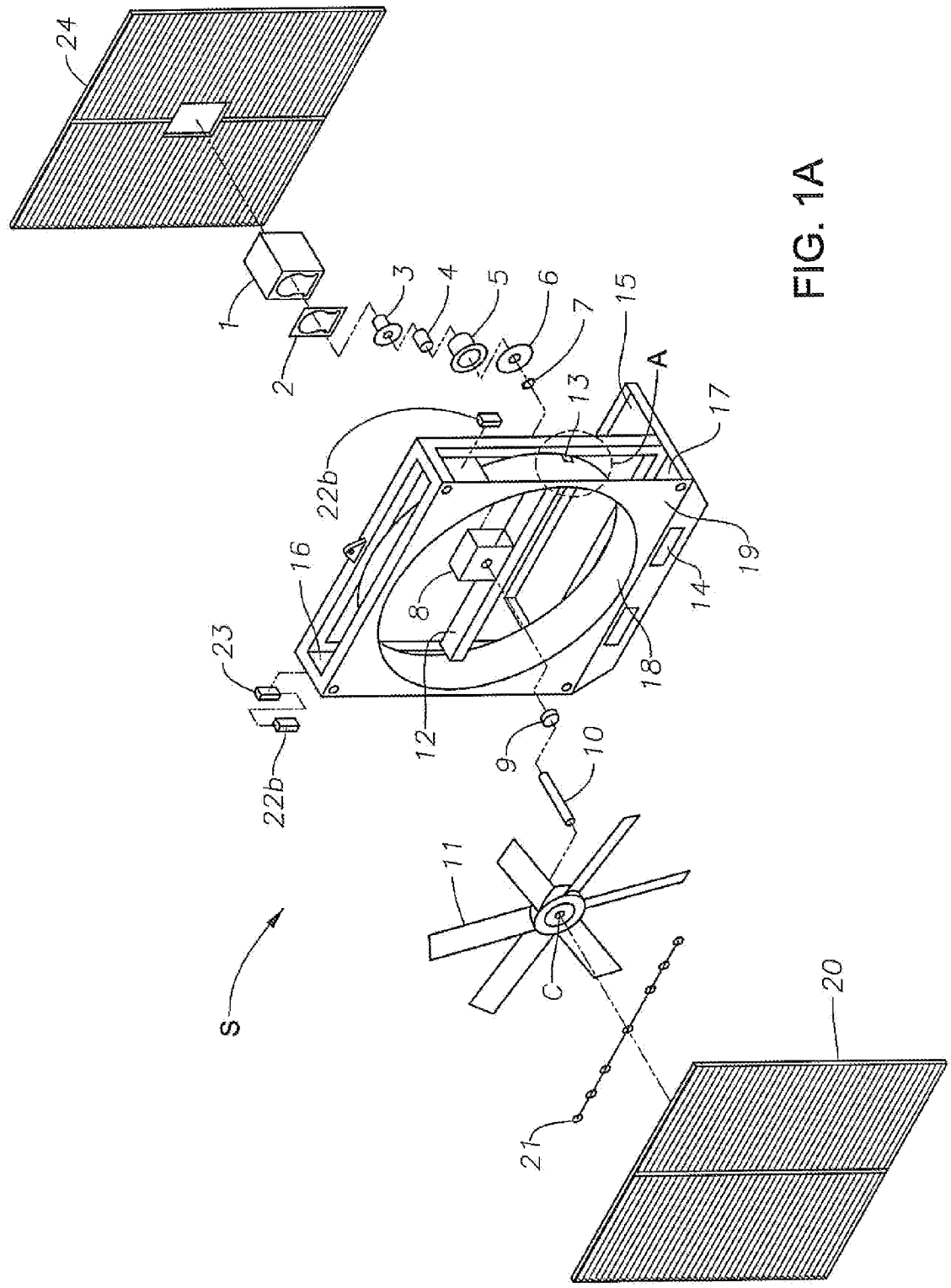
FIG. 1A is an exploded view of one embodiment of the hydraulic misting fan system.

Referring now to FIG. 1A, an exploded view of one embodiment of the hydraulic misting system "S" will now be described. As seen in FIG. 1, a cover 1 is included, wherein the cover 1 covers the hydraulic motor and hoses. A gasket 2 is provided that cooperates with the cover 1. A hydraulic fan motor 3 is positioned within the cover 1. The shaft coupling 4 is operatively associated with the motor 3. The system S includes the motor adapter bracket 5 that has the shaft 4 therein, with the bracket 5 being attached to the motor adapter spacer 6. A clipper seal 7 stops oil from the motor 3 from entering the air flow. The system S further includes the mounting block 8 which in turn is attached to the flange mount bearing 9. As seen in FIG. 1A, the blade shaft 10 is fitted through the bearing 9. The plurality of blades 11 have a center aperture "C", wherein the blade shaft 10 is fitted through the center aperture C.

Figure 1B:
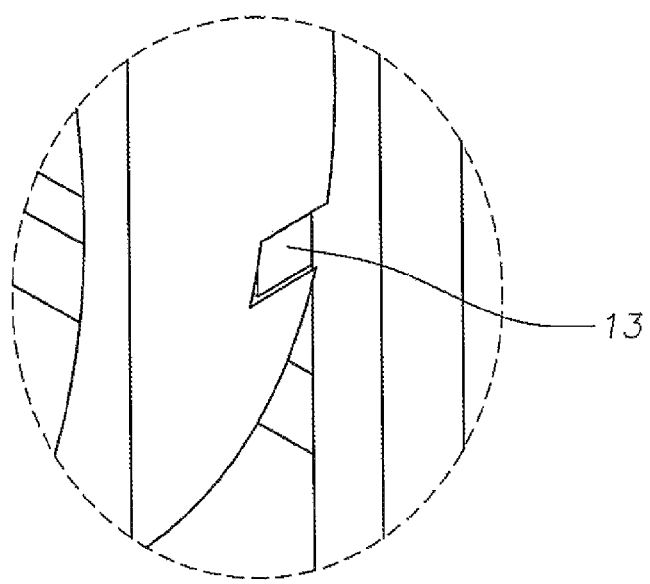
FIG. 1B is an enlarged view of the area denoted as "A" in FIG. 1A.

FIG. 1A further depicts the mounting block support 12, with the block support 12 being attached to the mounting block 8 such as by welding. A hose guide and fluid leak path is denoted at 13. FIG. 1B, which is an enlarged view of area A from FIG. 1A, depicts the hose guide and fluid leak path 13. Hence, the fluid path would include the area within hose guide and fluid leak path 13. The hose guide and fluid leak path 13 is a receptacle for any leaking hydraulic fluid and provides a passage for the hydraulic fluid. Returning to FIG. 1A, forklift pockets 14 are provided for lifting purposes. The system S also includes a drip pan 15 for collection of water from the system S. A control member 16 is depicted, wherein the control member 16 contains means for controlling speed of the motors as well as controlling valve setting such as on, off, and variable opening.

FIG. 1A depicts the fluid leak containment area 17, the shroud area 18, and the fan cap (front and back) 19 area. The intersection of all walls are seal welded thereby providing for a sealed container. The fluid leak path 13 provides for a passage to the containment area 17. With these areas, a safe deposit area for fluid discharging (i.e. hydraulic oil discharge due to seal failure or hose) from the fluid leak path 13 is formed. Also, FIG. 1A depicts the front guard 20 and rear guard 24 which may be a protective, permeable guard such as wire mesh to prevent a hand from entering front and rear. The high pressure misting system 21 which includes a nozzle, which in one preferred embodiment is an array of nozzles 21, with the nozzles 21 being fluidly connected to a piece of tubing. The nozzles are attached to this front guard 20 so that the atomization of the water is maximized. The misting system delivers a high pressure atomized mist at approximately 1000 pounds per square inch and directed into the air system through on/off valve 22b and through the nozzles 21 in the tubing attached to the front guard 20. In one embodiment, the nozzles are commercially available from Fogco Systems Inc. under the name Precision Nozzles. The on/off valve 22b is operatively attached to the control member 16 along with another on/off valve 22b which is operatively associated with the speed regulator valve 23 to the hydraulic fan motor 3. The speed regulator valve 23 provides for variable speed control of the hydraulic fan motor 3 which in turn allows for controlling air flow volume from the fan device. The volume of air flow is controlled by valve 23 and the mist volume is controlled by valve 22a. Therefore, volume of air flow and mist volume are independent of each other. The fan device herein disclosed can generate approximately 50,000 CFM of air volume and the nozzles can generate approximately 1,000 psi of mist pressure. The speed regulator valve 23 is commercially available from Motion Industries, Inc. under the name Pressure Regulator. It should be noted that like numbers appearing in the various figures refer to like components.

The present system S allows for an apparatus that occupies a smaller footprint on the rigs and weighs less than prior art devices which allows for enhanced portability. In one aspect of the disclosure, a single hydraulic power supply can provide power to multiple fans, with the multiple fans all running at the same time. In one embodiment, the system S may allow for a variable speed, higher CFM output, variable misting, clean running, more portable, smaller, light weight, more reliable, safer fan. The disclosed device is capable of delivering variable moisture for emergency cool down, for instance for treating burn victims or those with heat stroke. An aspect of one embodiment is that hydraulic oil is not placed in the air flow. Another aspect of one embodiment is the placing the hydraulic motor directly on the blade shaft inside a closed area and all hoses contained with a designed leak area away from airflow. Another aspect of one embodiment is that there are no electrical components and with aluminum construction, the device is rated explosion proof and without an electrical cord the safety is much higher. Prior art fan devices puts moisture in the air by means of saturated cardboard. An aspect of one embodiment is the misting system which atomizes the water so that the air flow is blowing a fog of cooling mist at approximately 1,000 pounds per square inch. The system S provides for cooling even on high humidity days. The nozzles are placed in front of the fan guard so as not to collect water in the guard itself. Another aspect is that valves may be used to adjust the amount of mist. For instance, one valve may be for a normal operation and another valve may be for emergency cool down, so that this fan could be considered an emergency treatment for heat exhaustion, stroke, burns or extinguishing fires. An added valve can deliver the cooling mist at an increased rate to the worker thereby reducing body temperature rapidly. Regarding the difference between high pressure (1,000 psi) and low pressure misting (tap water pressure at 45 psi), low pressure misting delivers larger water droplets which fall out of the air causing a wet or slick spot in front of the fan. High pressure, on the other hand, eliminates this problem by atomizing the water droplets so they stay suspended in the air.

Figure 2:
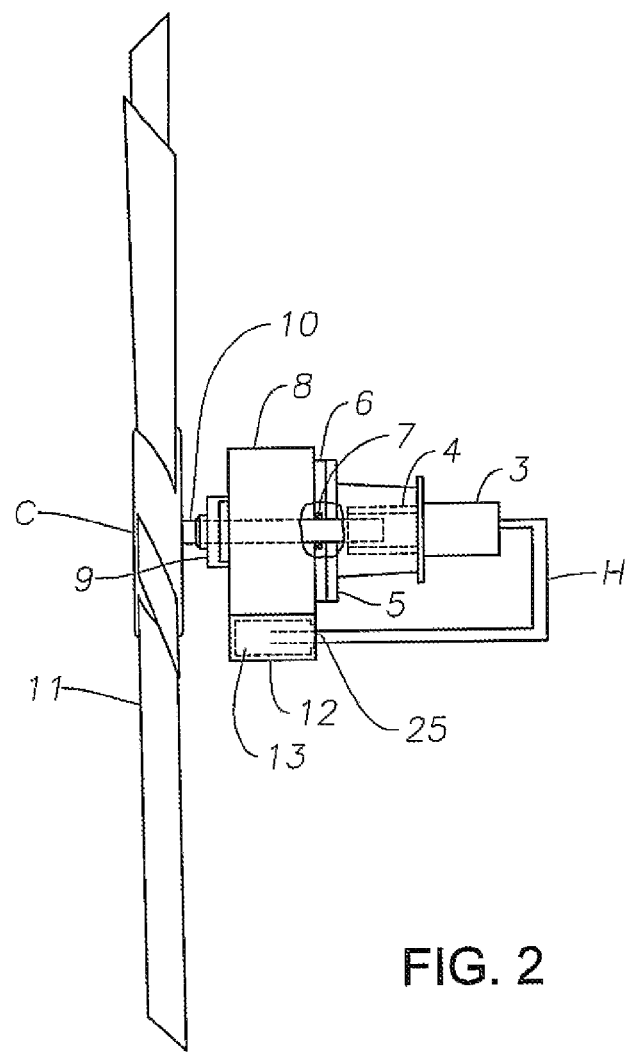
FIG. 2 is a partial side view of one embodiment of the fan drive assembly with hose without cover depicted in FIG. 1.

Referring now to FIG. 2, a partial side view of one embodiment of the fan drive assembly with hose without cover depicted in FIG. 1 will now be described. The fan drive assembly includes the hydraulic fan motor 3, shaft couple 4, the motor adapter bracket 5, motor adapter spacer 6, the clipper seal 7, the mounting block 8, the flange mount bearing 9 and the blade shaft 10, wherein the blade shaft 10 is connected to the blade 11 for rotation. The hydraulic leak path 25 is cut into the tubing support 12 and the output flow exits at the fluid leak path 13 and down to the drip pan 17 (not seen in this view) thereby preventing oil entering the air flow area.

Figure 3:
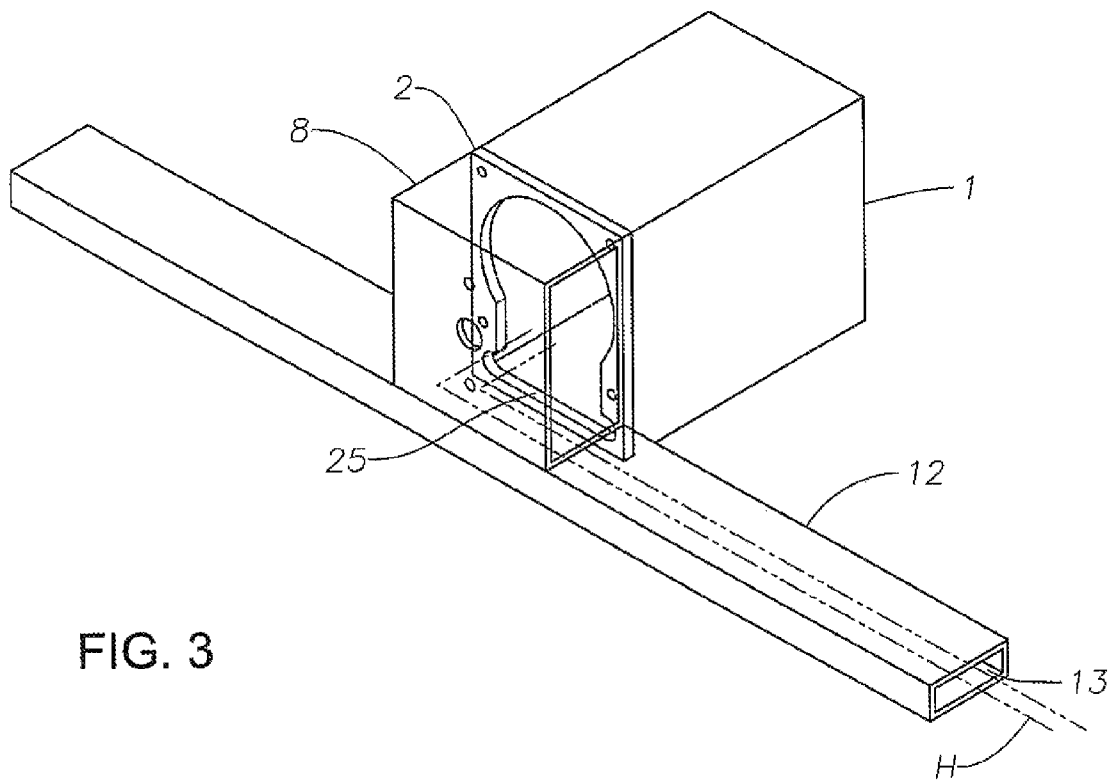
FIG. 3 is a perspective view of one embodiment of the cover and mounting block support depicted in FIG. 1.

FIG. 3 is a perspective view of one embodiment of the cover 1 and mounting block support 12 depicted in FIG. 1. Hence, the cover 1 has attached thereto the gasket 2 which in turn is attached to the mounting block 8. The mounting block support 12 is attached to the mounting block 8 and wherein the motor leak path 25 is depicted in FIG. 3. Additionally, the hose guide and fluid leak path 13 is shown. The guide/path 13 illustrates the hydraulic hoses "H". Therefore, the hoses H are enclosed within block support 12 in the event of any type of leak and/or rupture, and the fluids would end-up in the containment area 17. Hence, the leaked fluids will have a passage to drain via the leak path 25 and leak path 13.

Figure 4A:
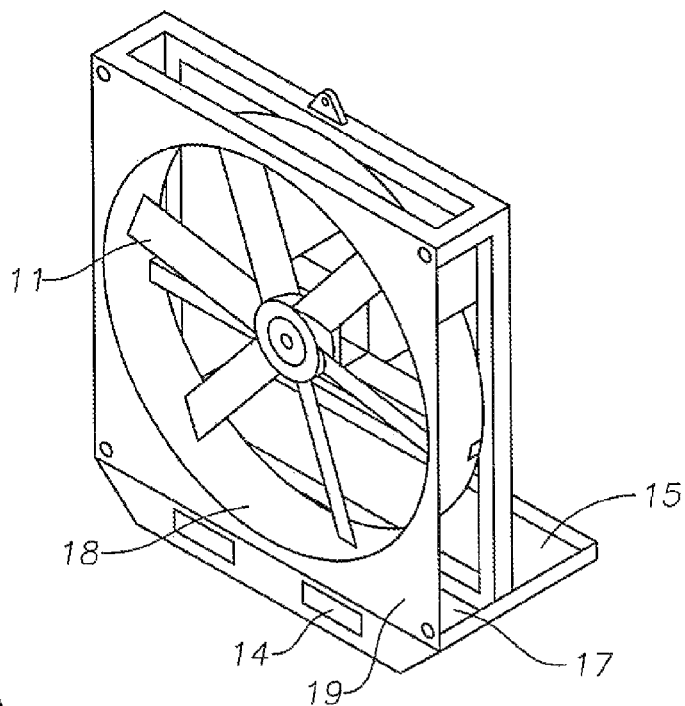
FIG. 4A is a perspective view of one embodiment of the fan assembly depicted in FIG. 1.
Figure 4B:
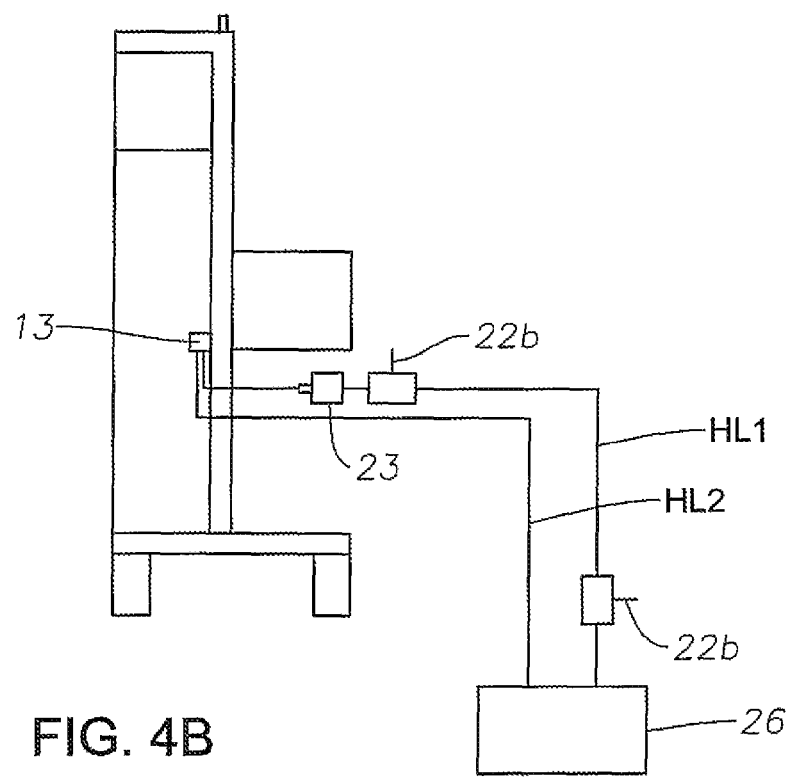
FIG. 4B is a side view of one embodiment of the fan assembly depicted in FIG. 1.
Figure 4C:
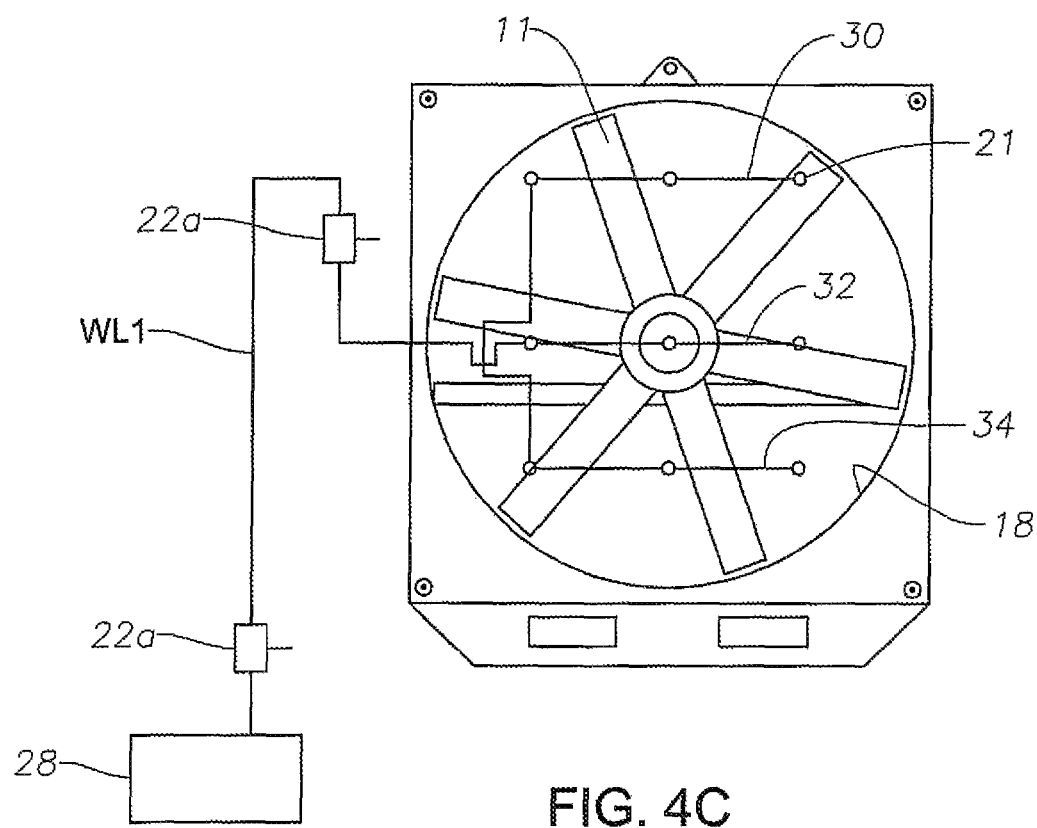
FIG. 4C is a front view of one embodiment of the fan assembly depicted in FIG. 1.

Referring now to FIG. 4A, a perspective view of one embodiment of the fan assembly depicted in FIG. 1 will be described. Accordingly, the fan caps 19 are shown with the blades 11 contained within the shrouds 18. The drip pan 15 and the fluid leak containment area 17 are shown for the collection of fluids. FIG. 4B is a side view of one embodiment of the fan assembly depicted in FIG. 4A along with the hydraulic supply means as will be more fully explained. The hydraulic power supply 26 is graphically shown, wherein the on/off valves 22b are placed in line with the hydraulic line HL1. The hydraulic power supply 26 includes the electric motor 26a and hydraulic oil pump 26b (shown in FIG. 5). The hydraulic line HL1 also contains in line the pressure regulator (speed) valve 23. As shown, the HL1 is directed into the leak path/hose guide 13. The hydraulic return line HL2 to the hydraulic power supply 26 is also shown. In FIG. 4C, a side view of one embodiment of the fan assembly depicted in FIG. 4B along with the water supply means 28. In the view of FIG. 4C, the array of nozzles 21 is shown, wherein the array of nozzles comprises a first array 30, a second array 32 and a third array 34. The arrays are arranged to provide mist to various areas to provide a blanket of coverage of mist. The arrays 30, 32, 34 are fluidly connected to the water line WL1 which connects the water power supply means 28 to the arrays 30, 32, 34. An on/off valves 22a are placed in the WL1 for controlling the water supply to the nozzles. Hence, as air flow is generated by the motor rotation of the blades 11, an air mist will be created so that a worker can be cooled. As per the teachings of the present disclosure, the air flow from the system S can be approximately 0-50,000 CFM of flow.

Figure 5:
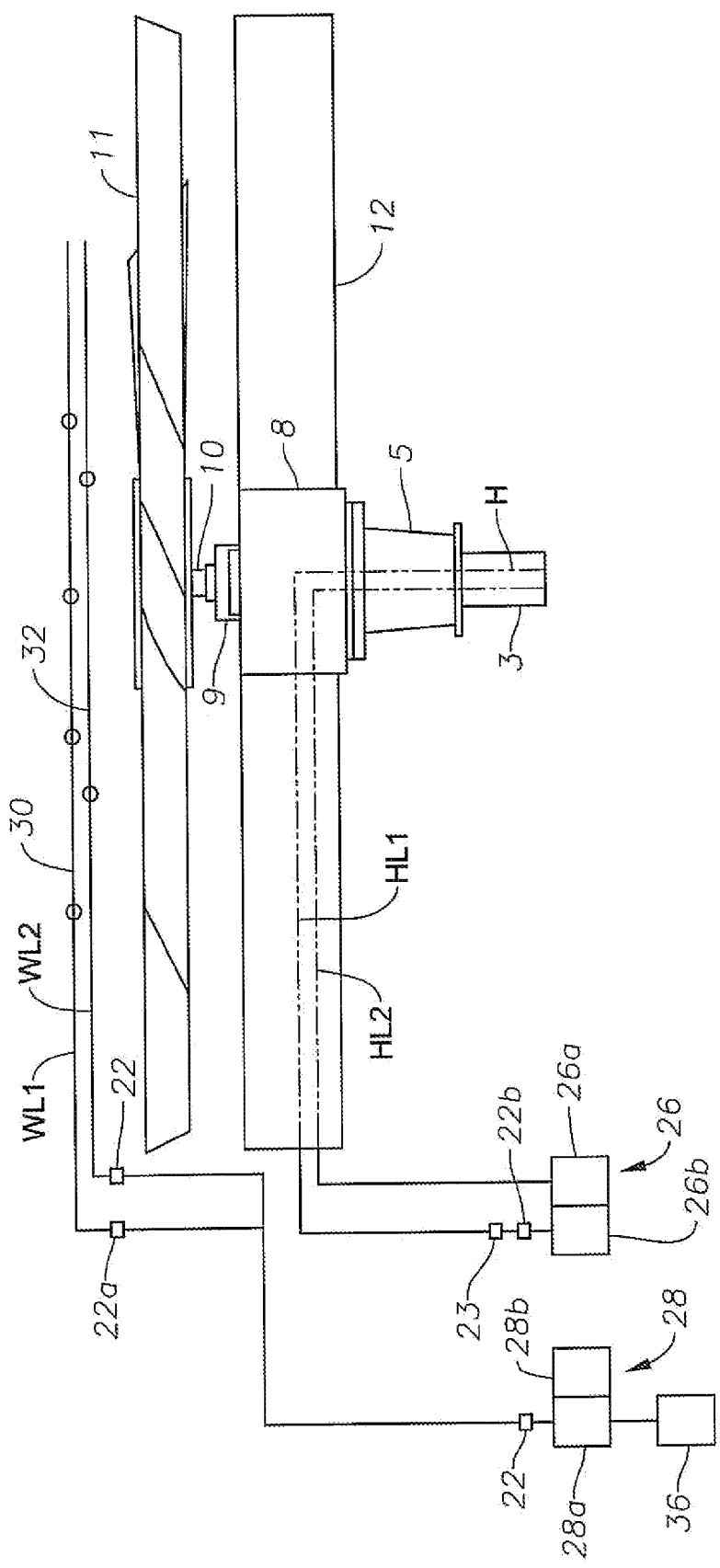
FIG. 5 is a partial side view of one embodiment of the fan drive assembly depicted in FIG. 1.

In FIG. 5, a partial side view of one embodiment of the fan drive assembly depicted in FIG. 1, along with the hydraulic power supply and water power supply, will now be described. As per the teachings of the disclosure, the single hydraulic power supply can power multiple fans, with the fans all running at the same time. The hydraulic lines HL1 and HL2 are connected to the motor 3. The hydraulic lines HL1 and HL2 are disposed through the motor adapter bracket 5 and into the mounting block support 12. The hydraulic lines HL1 and HL2 are connected to the hydraulic power supply 26 (i.e. electric motor 26a and hydraulic oil pump 26b) which delivers hydraulic power to the hydraulic fan motor 3. The on/off valve 22b is shown operatively associated with the line HL1 and located on the hydraulic power supply 26. FIG. 5 also depicts the fan blade 11 connected to the blade shaft 10 as well as the pressure regulator (speed) valve 23 which is located on the control member 16. The water power supply has the water line "WL" directed therefrom, wherein the water line WL is fluidly connected to the nozzles, and in particular, to the array 30 and the array 32. More specifically, the water power supply includes the electric motor 28a and the high pressure water pump 28b. The on/off valves 22a associated with the control member 16 are shown to regulate the water stream from the electric motor and pump means 28. It should be noted that a water filter 36 may also be used to filter the water.

Figure 8:
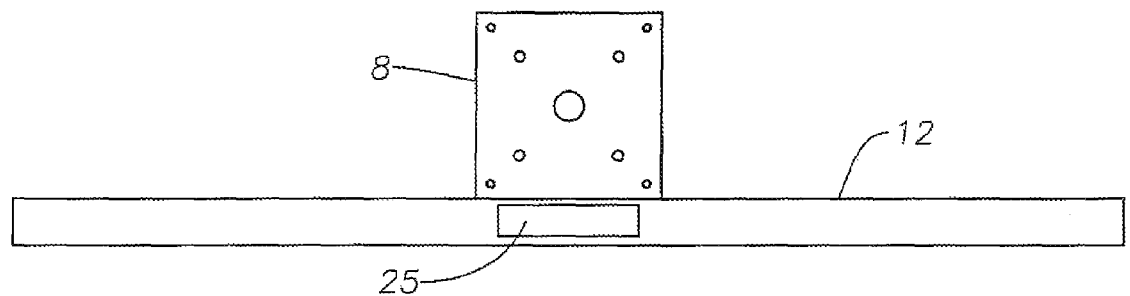
FIG. 8 is a partial rear view and leak path of one embodiment of the mounting block depicted in FIG. 1.

Referring now to FIG. 6, a perspective view of the cover 1 and gasket 2 embodiment depicted in FIG. 1 is shown. FIG. 7 is a partial sectional view of one embodiment of the complete fan drive assembly depicted in FIG. 1. This view depicts the motor 3 being connected to the blade shaft 10 via the shaft coupling 4. The clipper seal 7 is disposed about the blade shaft 10 and the motor adapter bracket 5 and the motor adapter spacer 6 is shown abutting the mounting block 8. Thus, the blade shaft 10 is attached to the blades for rotation. FIG. 8 is a partial rear view of one embodiment of the mounting block depicted in FIG. 1. The view of FIG. 8 depicts the mounting block 8 being attached to the mounting block support 12 along with the motor leak path 25 for the passage of the leaking hydraulic fluids as previously mentioned. The lower section of gasket 2 fits around leak path 25 so that any leakage from the hydraulic fan motor 3 or hoses HL1, HL2 are contained within the area of enclosed cover 1. The leaking fluid would then travel through 25 and out hose guide and fluid leak path 13 and down to containment area 17.

Figure 9:
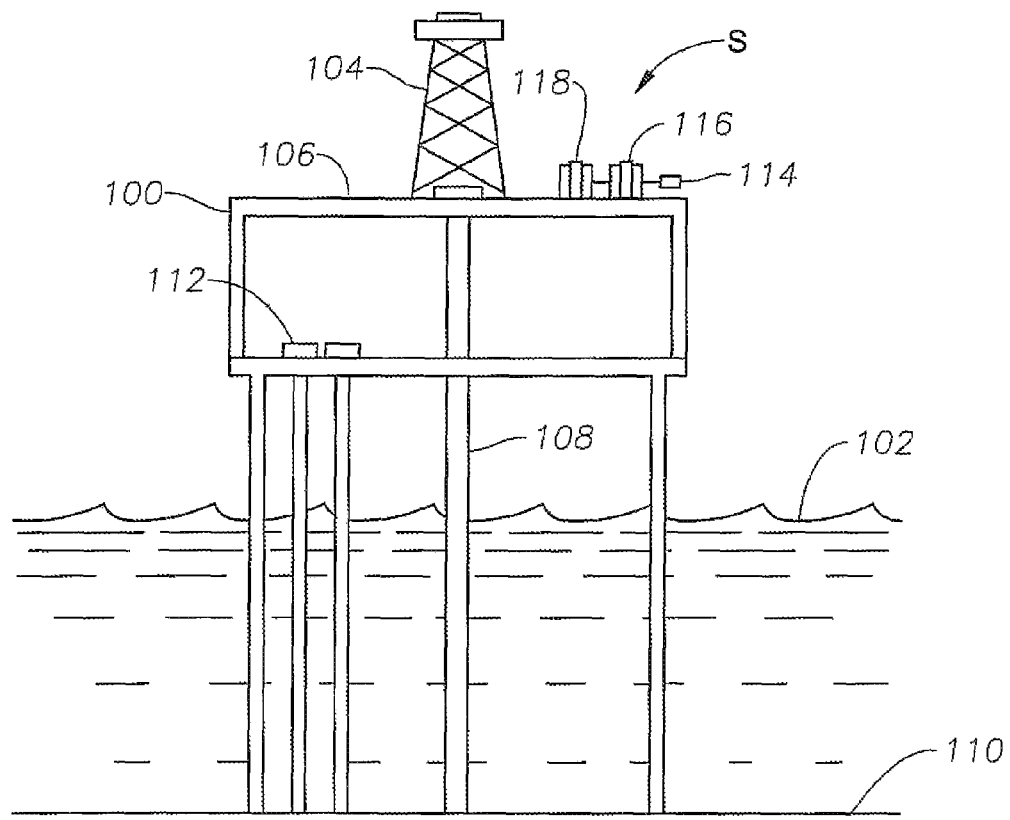
FIG. 9 is a schematic of an offshore oil and gas platform with the system contained thereon.

FIG. 9 is a schematic of an offshore oil and gas platform 100 with the system S contained thereon. Hence, the platform is in offshore waters, with the surface of the water denoted at 102. The platform 100 may have multiple decks for multiple operations. As seen in FIG. 9, a drilling rig with a derrick 104 is provided. The derrick 104 is positioned on a drill floor 106 and a riser 108 extends to the seafloor 110. The platform 100 has multiple legs that run from the platform to the seafloor 110. FIG. 9 also depicts the multiple wells, seen generally in the well bay area 112, wherein the wells extend below the seafloor to multiple subterranean reservoirs, as well understood by those of ordinary skill in the art. More specifically, FIG. 9 depicts the system S which includes a hydraulic power supply 114 (which includes and electric motor, hydraulic oil pump and water pump) that powers a first fan device 116 and a second fan device 118. Hence, the hydraulic power supply 114 delivers hydraulic fluid to multiple fan devices (116 and 118). The system S is applicable to other oil and gas installations i.e. land based oil and gas platforms such as drilling rigs and production facilities that are in remote areas and have similar safety regulations and constraints, as understood by those of ordinary skill in the art. As used herein, the term rig refers to drilling rigs, production facilities and/or platforms.

It will be apparent to one skilled in the art that modifications may be made to the illustrated embodiments without departing from the spirit and scope of the invention. Insofar as the description above and the accompanying drawings disclose any additional subject matter that is not within the scope of the claims below, the inventions are not dedicated to the public and the right to file one or more applications to claim such additional inventions is reserved.

I claim:

1. A misting fan system for use on oil and gas rigs comprising:
    a hydraulic fan motor for generating a rotational force from a hydraulic fluid, the hydraulic fan motor being contained within a cover that is affixed to a mounting block, the mounting block being affixed to a mounting block support that traverses a shroud;
    a water pump member for pumping water;
    a control member, the control member controlling the flow of the hydraulic fluid and the water;
    a fan device positioned within the shroud, the fan device having a plurality of blades for providing an airflow, the fan device being operatively connected to the hydraulic fan motor;
    one or more nozzles each fluidly connected to the water pump member for spraying a mist, the one or more nozzles each containing a variable opening for varying the volume of water discharged from the nozzle;
    a drip pan positioned below the fan device, the drip pan providing a fluid leak containment area;
    wherein the mounting block support includes an internal fluid leak path in fluid communication with the mounting block through which hydraulic fluid leaked from the hydraulic motor flows for containment in the fluid leak containment area of the drip pan.

2. The misting fan system of claim 1 wherein the fan device is configured to generate approximately 50,000 cubic feet per minute of air flow volume.

3. The misting fan system of claim 2 wherein the one or more nozzles are configured to generate approximately 1,000 pounds per square inch of mist pressure.

4. The misting fan system of claim 1 wherein the control member comprises:
    a speed regulator valve that controls the flow of the hydraulic fluid into the hydraulic fan motor;
    a water valve that controls the flow of the water into the one or more nozzles.

5. The misting fan system of claim 4 wherein the speed regulator valve and the water valve are each remotely controlled.

6. The misting fan system of claim 4 wherein the hydraulic fan motor is operatively associated with a hydraulic power supply, the hydraulic power supply including an electric motor and a hydraulic pump that delivers the hydraulic fluid to the hydraulic fan motor.

7. The misting fan system of claim 6 wherein the misting fan system is operatively associated with one or more additional misting fan systems, each additional misting fan system comprising:
    a hydraulic fan motor for generating a rotational force from a hydraulic fluid, the hydraulic fan motor being contained within a cover that is affixed to a mounting block, the mounting block being affixed to a mounting block support that traverses a shroud;
    a water pump member for pumping water;
    a control member, the control member controlling the flow of the hydraulic fluid and the water;
    a fan device positioned within the shroud, the fan device having a plurality of blades for providing an airflow, the fan device being operatively connected to the hydraulic fan motor;
    one or more nozzles each fluidly connected to the water pump member for spraying a mist, the one or more nozzles each containing a variable opening for varying the volume of water discharged from the nozzle;
    a drip pan positioned below the fan device, the drip pan providing a fluid leak containment area;
    wherein the mounting block support includes an internal fluid leak path in fluid communication with the mounting block through which hydraulic fluid leaked from the hydraulic motor flows for containment in the fluid leak containment area of the drip pan;
    wherein the hydraulic power supply delivers hydraulic fluid to each of the hydraulic fan motors of the misting fan system and the one or more additional misting fan systems.

* * * * *